Dec. 20, 1927.
J. A. GREEN
1,653,458
APPARATUS FOR TEACHING BY EAR THE RENDITION OF MUSICAL COMPOSITIONS
Filed Dec. 8, 1925
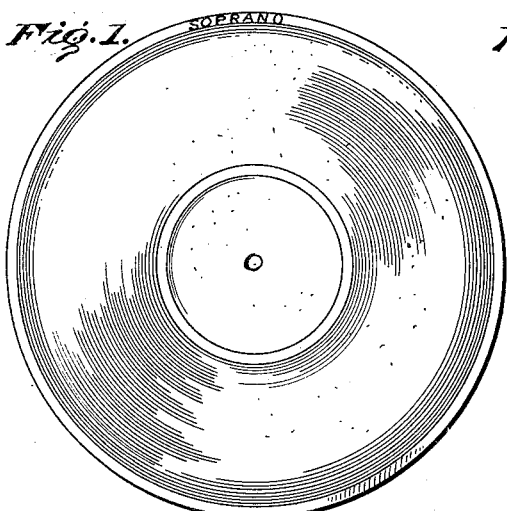
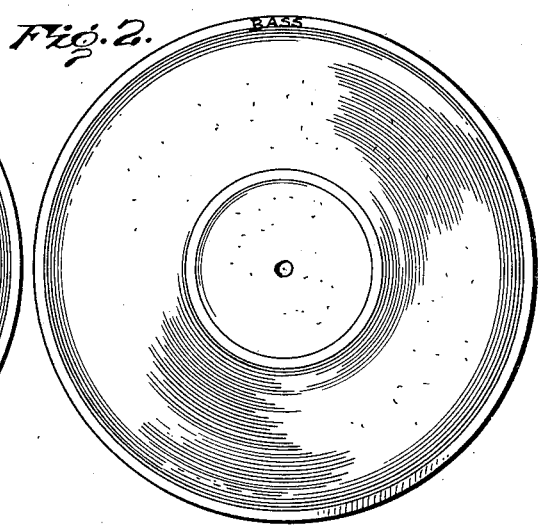
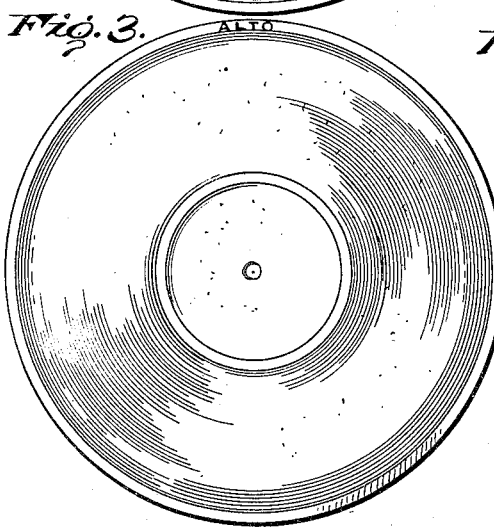
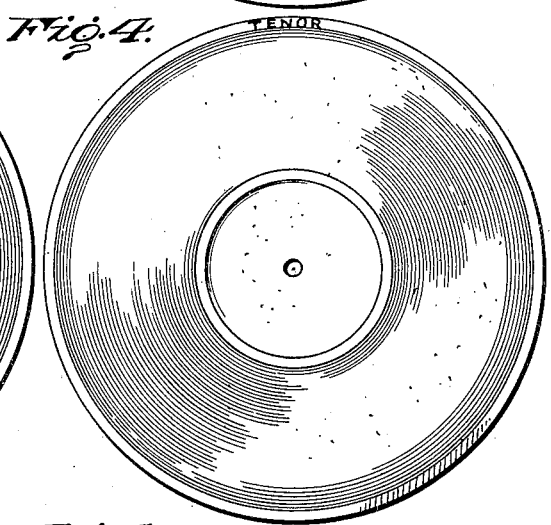
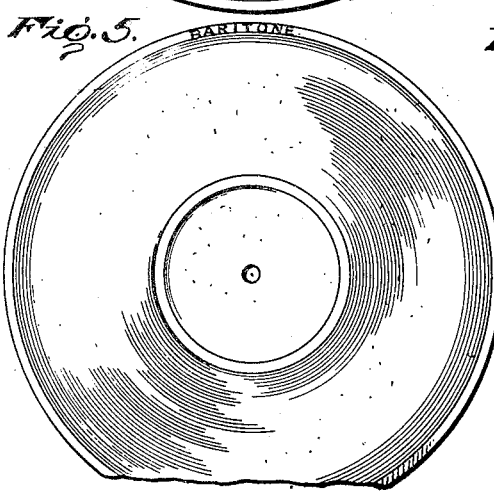
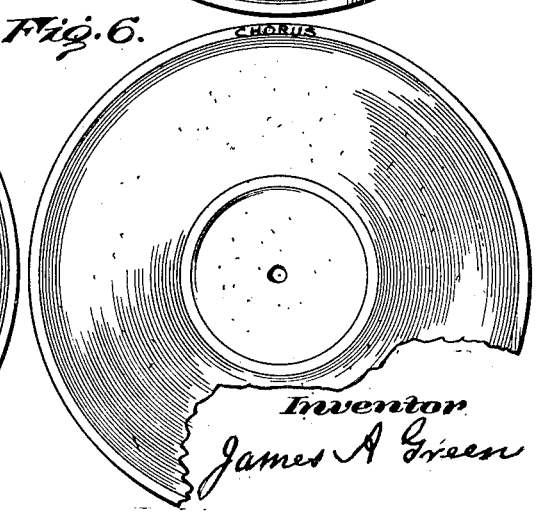
Inventor
James A Green Patented Dec. 20, 1927.

1,653,458

UNITED STATES PATENT OFFICE.

JAMES A. GREEN, OF BAYARD, VIRGINIA.

APPARATUS FOR TEACHING BY EAR THE RENDITION OF MUSICAL COMPOSITIONS.

Application filed December 8, 1925. Serial No. 74,007.

It is well known that often those who are talented in a musical sense cannot develop their talents except at great expense for tuition and, therefore, the present invention has as its object to provide means whereby talented persons of all ages, or those who even possess no talent for music, may readily develop their talents or acquire knowledge at a minimum expenditure of money for instruction, so that one who has had little or no instruction in music may, without any knowledge of musical notation, learn, by ear, the particular part which he or she is to sing or play either as a solo, or in a duet, trio, quartet, chorus, or other musical composition in two or more parts or voices.

In the accompanying drawings:

Figures 1 to 6 inclusive illustrate phonograph records which are employed in carrying out the principles of the invention.

The invention contemplates the provision of a plurality of phonograph records on each of which there has been recorded a singing or playing part of a musical composition. For example, the records shown in Figures 1, 2, 3, 4 and 5, represent the soprano, bass, alto, tenor and baritone parts of a choral composition, or these several records may constitute phonographic records of instrumental parts of a purely musical composition. The record shown in Figure 6 constitutes a phonographic record of the choral composition or musical composition embracing any two or more of the recorded parts constituting the records shown in Figures 1 to 5 inclusive, it being understood that a selection of the records shown in Figures 1 to 5 inclusive will be made in accordance with the number of voices or instruments which it is desired to utilize in the rendition of the composition.

It will now be evident that by employing the principles of the invention, those who have had no training in music, either vocal or instrumental, may, in a short while, learn to properly render any part of a musical composition embraced in the assemblage of records disclosed in the drawing, so that the renditions of great artists may be imitated either with or without instrumental accompaniment where the records constitute vocal parts. Therefore, those who are interested in churches, public schools, street quartets, and any other indoor or outdoor concerts, may take part in the same without the expense incident to a thorough training in musical notation.

The invention may well find embodiment in a form in which one part of a musical composition may be recorded on one side of a phonograph record and the entire composition recorded on the other side of said record.

Having thus described the invention, what I claim is:

1. Means for teaching by ear a musical composition in a plurality of parts or voices comprising a plurality of phonographic records each being of a separate part of said composition and another phonographic record of said composition in its entirety.

2. A set of phonographic records for teaching by ear a musical composition in a plurality of parts or voices comprising one or more records each being of a separate part and another phonographic record of a combination of the parts.

3. A disk phonographic record having on one side a record of a single part of a musical composition in two or more parts and on the other side a record including two or more of said parts in combination.

4. In means for teaching by ear a musical composition in a plurality of parts the combination of a phonographic record of one of said parts with a phonographic record of said composition in its entirety.

In testimony whereof, I affix my signature.

JAMES A. GREEN. [L. S.]